United States Patent
Szoke

(10) Patent No.: US 10,243,951 B2
(45) Date of Patent: Mar. 26, 2019

(54) SYSTEM AND METHOD FOR CONFIRMATION OF INFORMATION

(71) Applicant: Thomas Szoke, Apopka, FL (US)

(72) Inventor: Thomas Szoke, Apopka, FL (US)

(*) Notice: Subject to any disclaimer, the term of this patent is extended or adjusted under 35 U.S.C. 154(b) by 176 days.

(21) Appl. No.: 15/425,180

(22) Filed: Feb. 6, 2017

(65) Prior Publication Data

US 2017/0230359 A1 Aug. 10, 2017

Related U.S. Application Data

(60) Provisional application No. 62/291,355, filed on Feb. 4, 2016.

(51) Int. Cl.
*H04L 29/06* (2006.01)
*G06Q 50/18* (2012.01)
*H04W 12/06* (2009.01)

(52) U.S. Cl.
CPC ......... *H04L 63/0861* (2013.01); *G06Q 50/18* (2013.01); *H04W 12/06* (2013.01)

(58) Field of Classification Search
CPC .... H04L 63/0861; H04W 12/06; G06Q 50/18
See application file for complete search history.

(56) References Cited

U.S. PATENT DOCUMENTS

| | | | | |
|---|---|---|---|---|
| 7,934,098 B1* | 4/2011 | Hahn | ...................... | G06F 21/64 713/176 |
| 9,166,986 B1* | 10/2015 | Saylor | ................... | H04L 63/123 |
| 2002/0178122 A1* | 11/2002 | Maes | ..................... | G06Q 20/04 705/64 |
| 2004/0026500 A1* | 2/2004 | Brikho | ............... | G06Q 20/0425 235/379 |
| 2006/0161781 A1* | 7/2006 | Rice | ...................... | G06F 21/645 713/176 |
| 2010/0161993 A1* | 6/2010 | Mayer | ..................... | G06F 21/64 713/178 |
| 2011/0213700 A1* | 9/2011 | Sant'Anselmo | ....... | G06Q 10/10 705/39 |
| 2012/0072837 A1* | 3/2012 | Triola | .................... | G06Q 10/10 715/268 |
| 2013/0085944 A1* | 4/2013 | Fielder | ................. | G06Q 20/206 705/67 |
| 2013/0185565 A1* | 7/2013 | Appelbaum | ........ | G06F 21/6209 713/176 |
| 2013/0290728 A1* | 10/2013 | Spence | ................. | H04L 9/3231 713/186 |
| 2013/0325728 A1* | 12/2013 | Bialostok | ............... | G06Q 50/18 705/311 |
| 2013/0339256 A1* | 12/2013 | Shroff | .................. | G06Q 10/105 705/309 |
| 2014/0359722 A1* | 12/2014 | Schultz | ............... | H04L 63/0861 726/5 |
| 2015/0150141 A1* | 5/2015 | Szymanski | ........ | G06Q 30/0635 726/26 |

(Continued)

*Primary Examiner* — Matthew Smithers
(74) *Attorney, Agent, or Firm* — Bay State IP, LLC

(57) ABSTRACT

A system for information confirmation using a cloud computing platform to provide a service by which an individual's video recorded and fingerprint authenticated sworn affidavit or statement called a "Confirmation" can be given upon request of another individual and stored in a third party service provider's cloud based vault for future retrieval in the case of any legal or other forms of action that may need to be taken in the future.

6 Claims, 3 Drawing Sheets

(56) References Cited

U.S. PATENT DOCUMENTS

| | | | |
|---|---|---|---|
| 2015/0317635 A1* | 11/2015 | Karamchedu | G06Q 20/4014 |
| | | | 705/44 |
| 2016/0080426 A1* | 3/2016 | Fleischman | H04L 63/20 |
| | | | 713/168 |
| 2016/0127358 A1* | 5/2016 | Engelking | H04L 63/0861 |
| | | | 713/156 |
| 2017/0004591 A1* | 1/2017 | Kaminski | H04L 63/0823 |
| 2017/0076366 A1* | 3/2017 | Wadley | G06Q 40/02 |
| 2018/0026790 A1* | 1/2018 | Seo | G06F 21/645 |
| | | | 713/181 |

* cited by examiner

SYSTEM AND METHOD FOR CONFIRMATION OF INFORMATION

CROSS REFERENCE TO RELATED APPLICATION

This application takes the benefit of and claims priority to U.S. Provisional Application Ser. No. 62/291,355 filed on Feb. 4, 2016, the contents of which are herein incorporated by reference.

BACKGROUND OF THE INVENTION

Field of the Invention

The present system and method pertains to electronic confirmation transactions and more particularly to a secure method of transmitting and storing an electronic confirmation transaction through a multi-factor verification process.

Description of the Related Art

Currently, there exists a few types of phone applications for uploading and sharing documents. Some of these applications include dropbox and Google drive. These applications allow users to upload or create their own documents in the application. The applications do not offer pre-loaded documents. These types of applications also allow the user to control who can see the documents, as well as who is viewing the documents and when. Many of these services utilize cloud storage space, often for an additional cost.

There are also applications that allow for electronic signatures to be requested and provided. Some of these signature mobile applications allow the user to track the progress of the electronic signature request. Many of these applications are meant to be used in combination with a document application or website. It requires the user to create or upload a signature and then apply that image to downloaded documents in another application. Other applications are intended to be used directly within email allowing the user to request signatures and to be notified about their status. They also allow the user to select a signature from the application without having to leave the email application. A few allow for the creation of a document which can be sent with a signature and/or a signature request. These applications do not have pre-loaded documents and consistently utilize a written form of verification.

The two most common types of signatures that exist within these applications are electronic signatures and digital signatures. Electronic signatures are described as an image placed on the document which cannot show if someone tampers with the document after it has been signed. Digital signature applications, however, link a signature to a specific signee and keep a record of the document going forward making note of any alterations are made post-signature.

SUMMARY OF THE INVENTION

The instant system and method, as illustrated herein, are clearly not anticipated, rendered obvious, or even present in any of the prior art mechanisms, either alone or in any combination thereof. Thus the several embodiments of the instant apparatus are illustrated herein.

In one embodiment, the instant system contemplates a novel information confirmation system for secure delivery and storage of legal documents.

The instant system further discloses a novel information confirmation system with pre-loaded legal documents equipped with different verbiage which is categorized by type and territorial relevance. The system may utilize the date and/or timestamp and geo-location of a mobile device to select the appropriate verbiage. If verbiage for a specific jurisdiction is not available at the time of a request, the system shall notify a Requesting User of this limitation. The Requesting User may manually override the notification and still send a confirmation request to a providing User. The providing user may use this verbiage associated with the type of request, with the system providing a warning on the screen of the providing user's mobile device that the "Confirmation" they are providing may not be fully acceptable in a Court of Law. The requesting user shall also receive this warning again.

The instant system also discloses a novel information confirmation system that allows the user to upload documents.

It is also an objective of the instant system to disclose a novel information confirmation system that allows a user to request confirmation of a document by a provider.

Another objective of the instant system is a novel information confirmation system that allows a user to confirm a document through use of a front facing camera on a mobile device to record the spoken confirmation requested.

It is also an objective of the instant system to disclose a novel information confirmation system that allows users to confirm a document through the use of a front facing camera on a mobile device to record the spoken confirmation requested with the assistance of a prompt displayed on the screen of the device which highlights each word requested to be confirmed.

A further objective of the instant system is a novel information confirmation system that allows a user to verify information through use of a biometric reading, namely a fingerprint.

It is also an objective of the instant system to disclose a novel information confirmation system that allows a provider to review and re-record the confirmation until accepted by the provider through a fingerprint verification.

It is also an objective of the instant system to disclose a novel information confirmation system that allows a provider to control the number of views on any document they confirm at any time.

Another objective of the instant system is to disclose a novel information confirmation system that only stores the confirmed documents on a third-party secure cloud server and not on the mobile devices of the users, even temporarily.

A further objective of the instant system is to disclose a novel information confirmation system that allows a requesting user to review the confirmation and to accept or reject the providing user's confirmation once reviewed.

It is a further objective of the instant system to disclose a novel information confirmation system that allows a user to request assistance in selecting and reviewing documents. The instant system will then connect the user with registered third-parties, based on the issue, to assist with their specific need.

The instant system also discloses a novel information confirmation system that is easy to use.

The instant system further discloses a novel information confirmation system that is inexpensive.

A further objective of the instant system is a novel information confirmation system that is environmentally friendly.

The instant system also discloses a novel information confirmation system that is efficient.

There has thus been outlined, rather broadly, the more important features of the information confirmation system in order that the detailed description thereof that follows may be better understood, and in order that the present contribution to the art may be better appreciated. There are additional features of the system that will be described hereinafter and which will form the subject matter of the claims appended hereto.

In this respect, before explaining at least one embodiment of the system in detail, it is to be understood that the system is not limited in its application to the details of construction and to the arrangements of the components set forth in the following description or illustrated in the drawings. The system is capable of other embodiments and of being practiced and carried out in various ways. Also, it is to be understood that the phraseology and terminology employed herein are for the purpose of description and should not be regarded as limiting.

These together with other objects of the system, along with the various features of novelty, which characterize the system, are pointed out with particularity in the claims annexed to and forming a part of this disclosure. For a better understanding of the system, its operating advantages and the specific objects attained by its uses, reference should be made to the accompanying drawings and descriptive matter in which there are illustrated preferred embodiments of the system.

The foregoing has outlined the more pertinent and important features of the present system in order that the detailed description of the system that follows may be better understood, and the present contributions to the art may be more fully appreciated. It is of course not possible to describe every conceivable combination of components and/or methodologies, but one of ordinary skill in the art may recognize that many further combinations or permutations are possible. Accordingly, the novel architecture described below is intended to embrace all such alterations, modifications, and variations that fall within the spirit and scope of the appended claims.

BRIEF DESCRIPTION OF THE DRAWINGS

Advantages of the present system will be apparent from the following detailed description of exemplary embodiments thereof, which description should be considered in conjunction with the accompanying drawings, in which: Having thus described the system in general terms, reference will now be made to the accompanying drawings, which are not necessarily drawn to scale, and wherein.

DETAILED DESCRIPTION OF THE SEVERAL EMBODIMENTS

The detailed description set forth below in connection with the appended drawings is intended as a description of presently preferred embodiments of the system and does not represent the only forms in which the present system may be constructed and/or utilized. The description sets forth the functions and the sequence of steps for constructing and operating the system in connection with the illustrated embodiments.

Figure 1:
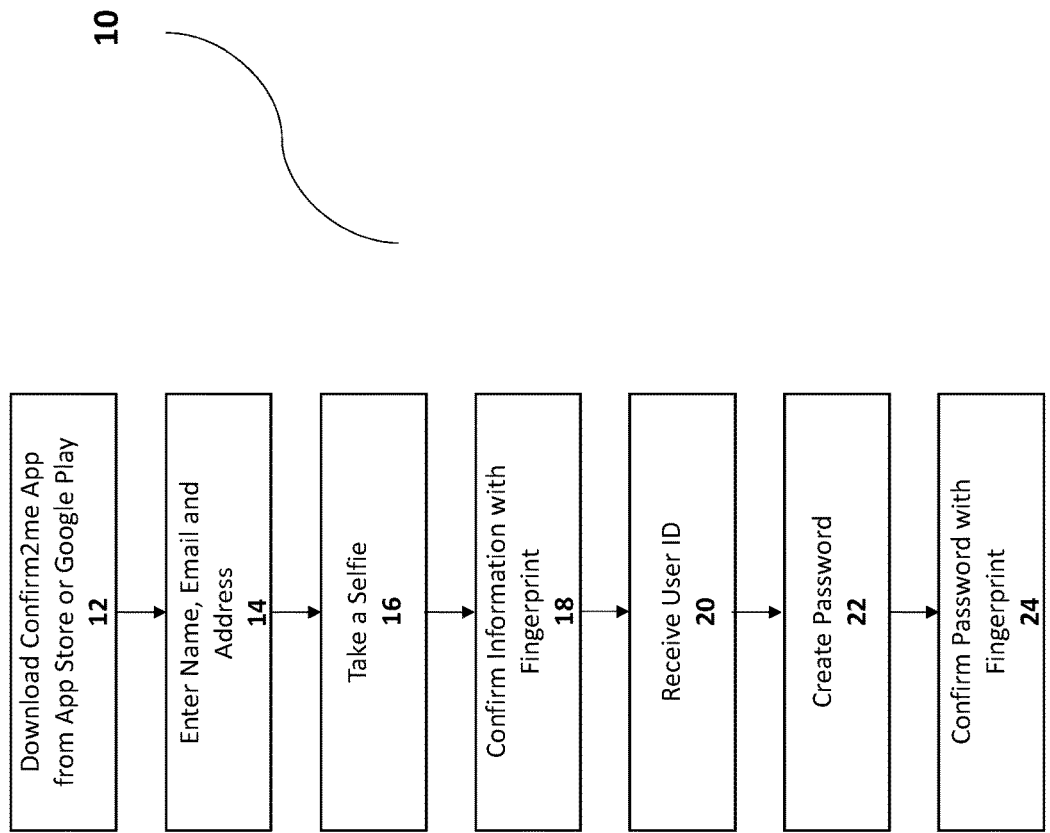
FIG. 1 illustrates a flow diagram of an exemplary embodiment of the information confirmation system download and user registration process.

FIG. 1 illustrates a flow diagram of an exemplary embodiment of a download and registration process for a user to enable the user to interact and utilize an information confirmation system 10. Initially at step 12, a user may download the information confirmation system 10 through iTunes or Google play onto a mobile device preferably including a front facing camera and biometric reading software, including, but not limited to fingerprint capabilities. Once the information confirmation system is downloaded, at step 14 the user is prompted to enter their name, address, and email. Once the information has been entered, at step 16, the user is prompted to take a picture of themselves utilizing the front facing camera on the user's mobile device. In order to accept the image, the user is prompted to confirm the use of the photo at step 18 through the biometric reader on the mobile device, in this example allowing for fingerprint verification of the user. Once the image has been confirmed, at step 20 the information confirmation system 10 issues the user a User ID. The user is then prompted to create a password and reenter the password at step 22. Finally the user is asked to confirm the creation of the password at step 24, again using the biometric reader on the mobile device of the user with a fingerprint verification.

Figure 2:
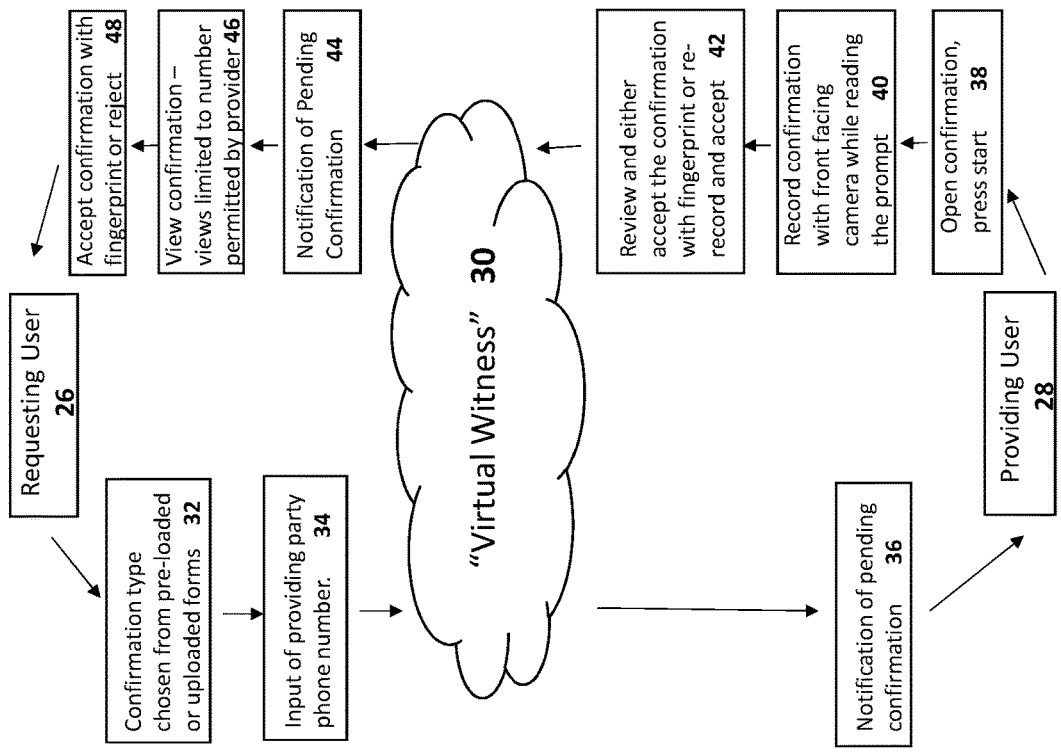
FIG. 2 illustrates a flow diagram of an exemplary embodiment of a method for a user of the information confirmation system to confirm to another user a chosen statement through an independent web based platform.

FIG. 2 illustrates a flow diagram of an exemplary embodiment to allow one person (a Providing User) confirm to another person (a Requesting User) a chosen statement through an independent web based platform 30 (a "Virtual Witness"). Initially, the Requesting User 26 chooses and confirms the type of confirmation they wish to receive at step 32 from the providing user 28. The Requesting User 26 may choose from a pre-loaded form or upload their own form for confirmation. If a pre-loaded form is chosen, the form is equipped with different verbiage which is categorized by type and territorial relevance. The information confirmation system 10 will use the date and/or timestamp and geo-location of the user's mobile device to select the appropriate verbiage. If verbiage for a specific jurisdiction is not available at the time of request, the information confirmation system 10 shall notify the Requesting User 26 of this limitation. The Requesting User 26 may manually override the notification and still send the Confirmation request to the Providing User 28. The Providing User 28 may use this verbiage associated with the type of request, with the information confirmation system 10 providing a warning on the screen of the Providing User's 28 mobile device that the "Confirmation" they are providing may not be fully acceptable in a Court of Law. The Requesting User shall also receive this warning again when they receive the Providing User's "Confirmation".

Next, at step 34, the Requesting User 26 enters the phone number of the Providing User 28. The entered information is then transmitted to the virtual witness 30. Subsequently, at step 36, the virtual witness 30 transmits a notification of a pending confirmation to the mobile device of the Providing User 28. In the instance when the Providing User 28 does not already have the information confirmation system 10 present on their mobile device, the Providing User 28 is presented with a link to download the information confirmation system 10 in either iTunes or Google Play. Alternatively, when the Providing user 28 is registered with the information confirmation system 10, then the pending notification provides a link to the information confirmation system 10, wherein the Providing User 28 may open and view the confirmation at step 38 by pressing "start". At step 40, the Providing user 28 records the confirmation or chosen statement of the Requesting user 26 by utilizing a front facing camera on the Providing user's 28 mobile device while reading the prompt displaying the requested confirmation. Then the Providing User 28 may review the recording at step 42 and either re-record the confirmation or accept the confirmation with a fingerprint verification on the mobile device of the Providing User 28. Once the confirmation is accepted and verified, at step 42, the confirmation is submitted to the virtual witness 30. At step 44, the virtual witness 30 notifies the Requesting User 26 of the pending confirmation. At step 46, the Requesting User 26 then views the confirmation sent from the Providing User 28. The Requesting User 26 is limited to the number of views specified by the Providing User 28. The Requesting User 26 may only view the confirmation again with permission from the Providing User 28 or with a court order. Finally, at step 48, the Requesting User 26 may either reject the confirmation or accept the confirmation with their fingerprint verification.

Figure 3:
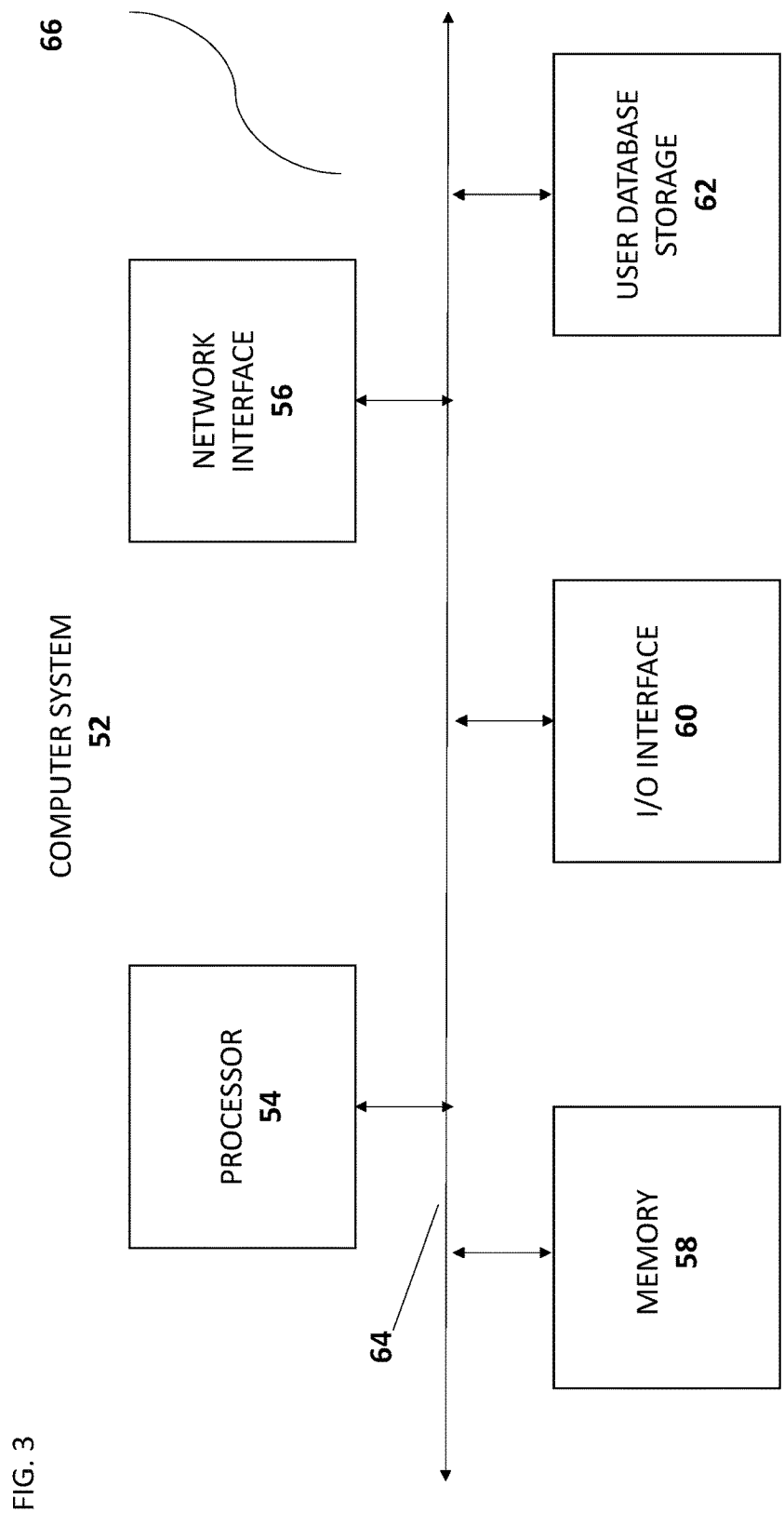
FIG. 3 illustrates one embodiment of an exemplary computing system, wherein the systems and methods disclosed herein may be implemented using one or more computer systems.

FIG. 3 illustrates an exemplary embodiment of a computer system 52, wherein the systems and methods disclosed herein may be implemented using one or more computer systems. As shown, the computer system 52 can include one or more processors 54 which can control the operation of the computer system 52. The processor(s) 54 can include any type of microprocessor or central processing unit (CPU), including programmable general-purpose or special-purpose microprocessors and/or any one of a variety of proprietary or commercially available single or multi-processor systems. The computer system 52 can also include one or more memories 58, which can provide temporary storage for code to be executed by the processor(s) 54 or for data acquired from one or more users, storage devices, and/or databases. The memory 58 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies. The various elements of the computer system 52 can be coupled to a bus system. The bus system can be any one or more separate physical busses, communication lines/interfaces, and/or multi-drop or point-to-point connections, connected by appropriate bridges, adapters, and/or controllers. The computer system 52 can also include one or more network interface(s) 56, one or more input/output (IO)) interface(s) 60, and one or more storage device(s) 62. The network interface(s) 56 can enable the computer system 52 to communicate with remote devices (e.g., other computer systems) over a network, and can be, for example, remote desktop connection interfaces, Ethernet adapters, and/or other local area network (LAN) adapters. The IO interface(s) 60 can include one or more interface components to connect the computer system 52 with other electronic equipment.

For example, the IO interface(s) 60 can include high speed data ports, such as USB ports, 1394 ports, etc. Additionally, the computer system 52 can be accessible to a human user, and thus the IO interface(s) 60 can include displays, speakers, keyboards, pointing devices, and/or various other video, audio, or alphanumeric interfaces. The storage device(s) 62 can include any conventional medium for storing data in a non-volatile and/or non-transient manner. The storage device(s) 62 can thus hold data and/or instructions in a persistent state (i.e., the value is retained despite interruption of power to the computer system 52). The storage device(s) 62 can include one or more hard disk drives, flash drives, USB drives, optical drives, various media cards, and/or any combination thereof and can be directly connected to the computer system 52 or remotely connected thereto, such as over a network.

In addition, not all of the illustrated elements need to be located on or in the same physical or logical machine. Rather, the illustrated elements can be distributed in nature, e.g., using a server farm or cloud-based technology. Exemplary computer systems include conventional desktop computers, workstations, minicomputers, laptop computers, tablet computers, PDAs, mobile phones, and the like. Although an exemplary computer system is depicted and described herein, it will be appreciated that this is for sake of generality and convenience. In other embodiments, the computer system may differ in architecture and operation from that shown and described here.

What is claimed is:

1. An information confirmation system configured to have one person confirm to another a chosen statement, the information confirmation system comprising:
   a processor, a memory and a plurality of storage devices;
   the information confirmation system when executed performs the steps of:
      selecting a confirmation by a requesting party that the requesting party wants to receive from a providing user;
      entering a phone number of the providing user by the requesting party into the information confirmation system on the requesting party's mobile device;
      transmitting the entered information to a virtual witness;
      transmitting a notification of a pending confirmation by a virtual witness to a mobile device of the providing user;
      viewing the confirmation by the providing user;
      recording the chosen statement of the requesting party by utilizing a front facing camera on the providing user's mobile device while reading a prompt displaying the requested confirmation;
      reviewing the recording by the providing user to either re-record the confirmation or accept the confirmation with a fingerprint verification on the mobile device of the providing user;
      submitting the verified confirmation to the virtual witness;
      notifying the requesting party of the pending confirmation;
      viewing the confirmation sent from the providing user by the requesting party; and
      accepting the confirmation with the fingerprint verification of the requesting party.

2. The information confirmation system configured to have one person confirm to another a chosen statement of claim 1, wherein the requesting party may choose from a pre-loaded form or upload their own form for the chosen statement.

3. The information confirmation system configured to have one person confirm to another a chosen statement of claim 1, wherein the date and/or timestamp and geo-location of the requesting party's mobile device selects the appropriate verbiage for the chosen statement.

4. The information confirmation system configured to have one person confirm to another a chosen statement of claim 1, wherein the requesting party will be notified of verbiage for a specific jurisdiction is unavailable.

5. The information confirmation system configured to have one person confirm to another a chosen statement of claim 4, wherein the requesting party may override the notification.

6. The information confirmation system configured to have one person confirm to another a chosen statement of claim 1, wherein the requesting party is limited to the number of views of the chosen statement specified by the providing user.

\* \* \* \* \*